United States Patent [19]

Shook

[11] Patent Number: 4,850,733
[45] Date of Patent: Jul. 25, 1989

[54] EXPANDER FOR A SEAT POST INSERTED IN A BICYCLE FRAME TUBE

[75] Inventor: William B. Shook, Bremen, Ohio
[73] Assignee: Thurston, Inc., Columbus, Ohio
[21] Appl. No.: 290,616
[22] Filed: Dec. 27, 1988
[51] Int. Cl.⁴ .............................................. F16B 7/10
[52] U.S. Cl. .................................... 403/104; 403/290; 297/195
[58] Field of Search ........................ 403/118, 104, 290; 248/412; 74/551.1; 297/195

[56] References Cited

U.S. PATENT DOCUMENTS

| 624,232 | 5/1899 | Marty, Jr. | 403/104 |
| 661,620 | 11/1900 | Rumbarger | 403/290 |
| 693,159 | 2/1902 | Rumbarger | 403/290 |
| 1,037,287 | 9/1912 | Mesinger . | |
| 1,045,999 | 12/1912 | Mesinger . | |
| 2,186,483 | 1/1940 | Guidetti . | |

Primary Examiner—Andrew V. Kundrat
Attorney, Agent, or Firm—William V. Miller

[57] ABSTRACT

An expander for a bicycle seat support post inserted into a tubular socket of the bicycle frame. The post has an expandable collar which is expanded by means of a wedge-like expanding member which projects from the collar and which is moved axially thereto by means of a tension link. Movement of the link to pull the wedge-like member farther into the collar is accomplished by a screw angularly supported on the post at an angle of less than ninety degrees to its axis.

7 Claims, 1 Drawing Sheet

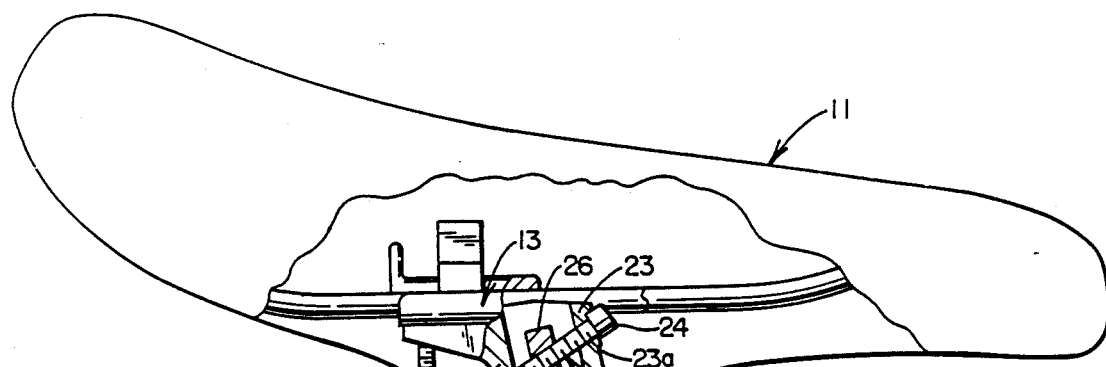
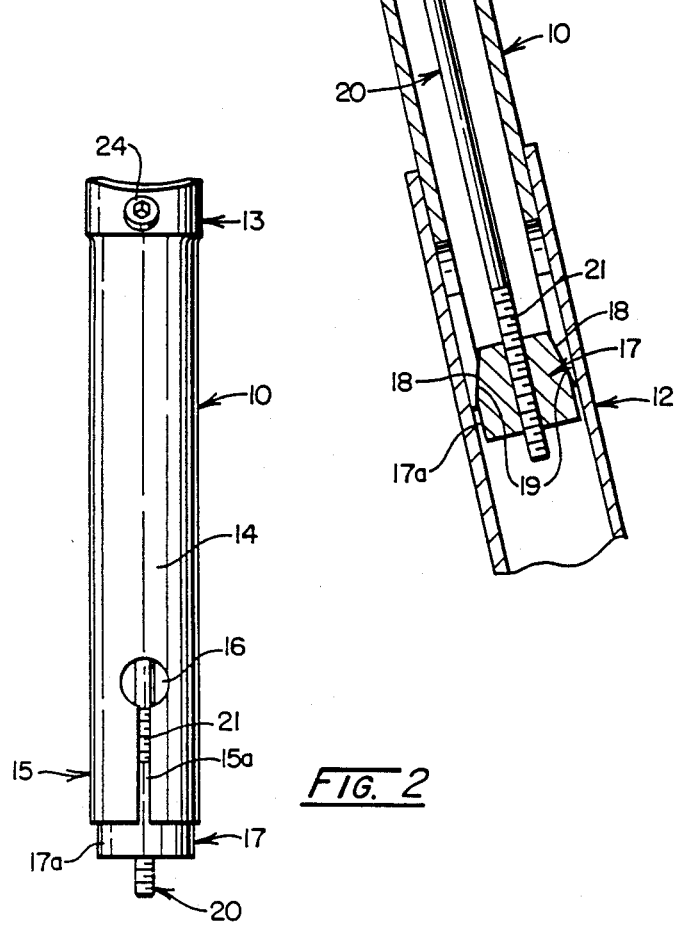
FIG. 1
FIG. 2

EXPANDER FOR A SEAT POST INSERTED IN A BICYCLE FRAME TUBE

FIELD OF INVENTION AND PRIOR ART

This invention relates to a post which supports the seat of a bicycle on the bicycle frame by being inserted in the upwardly-opening split end of a tube forming part of the frame. At the present time a simple clamp arrangement is used to clamp the post in the tube. Another arrangement commonly used in the art is an expanding seat post, but in both arrangements it is difficult to gain access to an expanding bolt. Most prior art expanders use an axial bolt. Normally this has two disadvantages; the bolt must carry a torque load during tightening, and the bolt must be tightened from the top of the post, under the saddle, a very hard place to access.

Another method uses a cam to pull a wedge upward via a connecting link. This cam is rotatable and is set perpendicular to the post axis. The problems arising from this design are; the cam must be rotated to fully locked position or it may open by itself, it must rotate past center then stop against something to prevent further rotation.

SUMMARY OF THE INVENTION

The present invention provides a hollow post which supports the seat and which is split at its lower end for fitting into an upwardly-opening socket in the upper end of a tube forming part of the frame. Novel means is provided for expanding the lower end of the post so that it is securely positioned in the socket at any desired level. This means comprises a wedge member which is positioned at the lower split end of the post and which can be drawn upwardly by means of a rod or link connected thereto in its lower end. The link is drawn upwardly by a rotatable bolt which is carried in an inclined position in the post and is threaded through the rod so that rotation of the screw will exert an upward pull on the link to raise the wedge in the lower split end of the post and raise it to expand into tight contact with the tube of the frame.

BRIEF DESCRIPTION OF THE DRAWING

The best mode contemplated in carrying out this invention is illustrated in the accompanying drawing in which:

FIG. 1 is a view mainly in vertical section showing the seat post of a bicycle and the means of this invention for expanding it.

FIG. 2 is an elevational view of the post and its expanding means.

DETAILED DESCRIPTION OF THE INVENTION

With specific reference to the drawing this invention provides a post 10 for supporting a seat 11 in tube 12 of a bicycle frame. The seat 11 may be of any desired type and is attached to the upper end of the post by any suitable means common in the art and may include a support 13 formed on the upper end of the post 10.

The post 10 is in the form of a hollow tube 14 which has its lower end formed as an expandable collar 15 by means of one or more circumferentially spaced slits 15a extending upwardly from its lower end to circular cuts 16. These slits are of sufficient depth to permit the desired expansion when inserted into the upper open or socket end of the tube 12 of the bicycle frame. However the expandable post end or collar could be made in other ways to be capable of expansion transversely into tight contact with the socket of the tube 12.

A wedge or plate 17 is fitted into the lower split end of the post 10. This wedge or plate has a lower straight section or extremity 17a which is of a width substantially corresponding to the diameter of the post 10 and is initially positioned below the lower extremity of the post. The plate has inwardly angled edges or surfaces 18 so it is an upwardly directed wedge section and these edges contact with complemental tapered annular surface 19 on the interior of the lower extremity of the post 10. The wedge plate 17 is of a thickness greater than that of each of the slits 15. Thus, there is a wedge-shaped member which is positioned in the lower open end of the post and is movable farther upwardly therein to expand the split collar end of the post or to compress the material of the collar.

The plate or wedge 17 is suspended by a rod or link 20 which extends upwardly through the post 10. This link has a threaded lower end which extends through a drilled and tapped bore in the wedge 17. Thus, the wedge is adjustable axially on the link 20 so that the edges 18 of the wedge are in contact with the tapered surface 19 at the lower extremity of the post. This adjustment allows for presetting the expansion of post 10 to a tight slip-fit in the frame tube 12 when the tightening mechanism is in the fully loosened position.

The upper end of the link 20 is suspended from the post 10 by a lifting screw 25. This lifting screw is supported in an included position at the upper end of the post extending transversely thereof. It is provided with a reduced lower extremity fitted rotatably in an opening 22a in the shouldered portion 22 of post 10 and at its upper head end is freely rotatable in a opening 23a in the shouldered portion 23 of the post 10. The axis of the openings 22a and 23a are in the same diametrical plane of the post but the openings are in different positions axially of the post so that the lifting screw is held at an angle less than ninety degrees relative to the post axis and will be in an inclined position. A turning head 24 is exposed at the upper end of the screw for receiving a wrench or other tool. A head 26 on the upper end of the link 20 is drilled and tapped to match the threaded main section of the lifting screw which is passed therethrough.

To use this invention, the post 10 is prepared for insertion in the tube 11 by turning the raising or lifting screw 25 counter-clockwise to push the connecting link 20 axially outwardly from the split collar outer end of the post 10. The split or collar end could be made as a separate member instead of an integral part of the post as shown. The plate or wedge 17 is then threaded onto the extended threaded outer section 21 of the link. This wedge member instead of being a plate could be an annular member in the form of a conform unit. The member 17 is threaded axially onto the link 20 until it is in contact with the split collar end of the post. Then the post assembly is inserted axially into upwardly-opening end of the tube 12. If the inclined raising screw is now turned clockwise the plate 17 will be pulled further into the expanding collar end of the post 10 to expand it into tight contact with the tubular post 12.

Thus, this invention provides a simple positive means for mounting a seat 11 on the upwardly-opening socket end of a bicycle frame tube 12 or the like. The post has a split or otherwise expandable collar at its outer end which is insertable in the tubular socket of support tube 12. For expanding the collar in the socket a wedge-like member is initially inserted in the collar in a position determined by a link on which it is threaded. This link is pulled inwardly into the collar by means of a screw 25 which is threaded through an inner head carried thereby. This screw is mounted in the post in an inclined position relative to the axis thereof. Rotation of the screw 25 in the proper direction pulls the wedge member 17 further axially inwardly into the collar 15 to tightly secure the post in the socket of the tube 12. The wedge member may be in the form of a wedge-like plate or a tapered body, such as a coniform nut, or any other expanding member which has a tapered end fitting into the expandable post member and movable axially thereinto by a pull on a tension link developed by the angularly disposed screw.

The inclined screw of this invention is accessible from the front of the post (or side), it does not put torque into the long linkage to the wedge and will maintain position even when only tightened through part of its take-up range.

Having thus described the invention what is claimed is:

1. The combination of a post insertable in an axially-outwardly opening tubular socket of a support tube, said post being in the form of a tube having an expandable collar end adapted to be inserted in the socket, means for expanding said collar end, said means comprising a wedge member disposed in the collar end and means for moving that wedge member axially into the collar end, means including a link which carries the wedge member at its outer end in engagement with the collar end, and a screw which is threaded through the link at its inner end, said screw being rotatably carried by the post at an angle of less than ninety degrees relative to the axis of the tubular post.

2. The combination of claim 1 in which the collar end has one or more inwardly extending splits to permit expansion thereof.

3. The combination of claim 1 in which the link has a threaded outer end which is threaded through the wedge member so it can be adjusted therealong.

4. The combination of claim 3 in which the link has a head on its inner end through which the screw is threaded.

5. The combination of claim 1 in which the wedge member has an angled wedge-like section fitting into the outer end of the expandable collar and projecting therefrom.

6. The combination of claim 5 in which the outer end of the tubular collar has tapered surfaces engaged by complemental surfaces on the wedge member.

7. A tubular member having a tubular end adapted to be inserted in a tubular socket, means for expanding that end in the socket, said mains comprising a wedge member extending into the tubular end for expanding it, a link carrying said wedge member and extending into the tubular member and means for drawing the wedge member into the tubular member comprising a screw threaded through the link, said screw being supported by the tubular member for rotation at an angle of less than ninety degrees relative to the tubular member.

* * * * *